(12) United States Patent
Houbertz-Krauss et al.

(10) Patent No.: US 9,470,858 B2
(45) Date of Patent: Oct. 18, 2016

(54) OPTICAL PACKAGE AND A PROCESS FOR ITS PREPARATION

(71) Applicant: Multiphoton Optics GmbH, Würzburg (DE)

(72) Inventors: Ruth Houbertz-Krauss, Würzburg (DE); Markus Riester, Seiersberg (AT)

(73) Assignee: Multiphoton Optics GmbH, Würzburg (DE)

(*) Notice: Subject to any disclaimer, the term of this patent is extended or adjusted under 35 U.S.C. 154(b) by 0 days.

(21) Appl. No.: 14/760,210

(22) PCT Filed: Jan. 13, 2014

(86) PCT No.: PCT/EP2014/050495
§ 371 (c)(1),
(2) Date: Jul. 10, 2015

(87) PCT Pub. No.: WO2014/108539
PCT Pub. Date: Jul. 17, 2014

(65) Prior Publication Data
US 2015/0338587 A1 Nov. 26, 2015

Related U.S. Application Data

(60) Provisional application No. 61/751,511, filed on Jan. 11, 2013.

(51) Int. Cl.
*G02B 6/36* (2006.01)
*G02B 6/42* (2006.01)
(Continued)

(52) U.S. Cl.
CPC .......... *G02B 6/4257* (2013.01); *G02B 6/12002* (2013.01); *G02B 6/138* (2013.01); *G02B 6/30* (2013.01); *G02B 6/4206* (2013.01); *G02B 6/4255* (2013.01)

(58) Field of Classification Search
CPC G02B 6/4257; G02B 6/12002; G02B 6/138; G02B 6/30; G02B 6/4206; G02B 6/4255
USPC ......................................................... 385/92
See application file for complete search history.

(56) References Cited

U.S. PATENT DOCUMENTS 5,532,398 A 7/1996 Wolter et al.
5,792,881 A 8/1998 Wolter et al.
(Continued)

FOREIGN PATENT DOCUMENTS

WO 03/037707 A1 5/2003
WO 2009/089560 A2 7/2009
(Continued)

OTHER PUBLICATIONS

Pinnel M R et al.:"Interconnection System Requirements and Modeling", AT&T Technical Journal, 66(4), pp. 45-55 (1987).
(Continued)

*Primary Examiner* — Sung Pak
(74) *Attorney, Agent, or Firm* — Gudrun E. Huckett

(57) ABSTRACT

The present invention is directed to a package including optical components, comprising: (i) at least one structure, the structure having at least one optical input or output, (ii) at least one optical interconnection, optically connected to the at least one optical input or output, and (iii) a component in which the at least one optical interconnection and the at least one optical input or output is embedded, wherein (a) the component (iii) embedding the at least one optical interconnection and the at least one optical input or output and the at least one optical interconnection (ii) are made from a chemically identical material, wherein the material of the at least one optical interconnection has a different primary and/or secondary structure, compared to the material of the component embedding the at least one optical interconnection and the at least one optical input or output, (b) the component (iii) embedding the at least one optical interconnection and the at least one optical input or output and the at least one optical interconnection (ii) have a difference in their refractive indices of at least 0.0004 to 0.0015 at 850, 1310, and 1550 nm, respectively, and (c) the at least one optical interconnection (ii) is mechanically fixed by the component (iii) embedding the at least one optical interconnection and the at least one optical input or output. Further, the invention provides methods for the preparation of the said package.

19 Claims, 9 Drawing Sheets

(51) Int. Cl.
  *G02B 6/30* (2006.01)
  *G02B 6/12* (2006.01)
  *G02B 6/138* (2006.01)

(56) References Cited

U.S. PATENT DOCUMENTS

| | | | |
|---|---|---|---|
| 6,124,491 | A | 9/2000 | Wolter et al. |
| 6,181,718 | B1 * | 1/2001 | Kobayashi .......... H01S 5/02284 372/34 |
| 6,794,527 | B1 | 9/2004 | Wolter et al. |
| 6,867,668 | B1 * | 3/2005 | Dagostino ............... H01L 23/66 257/E23.065 |
| 6,985,659 | B2 * | 1/2006 | Torigoe ................. G02B 6/4201 385/114 |
| 7,307,293 | B2 | 12/2007 | Fjelstad et al. |
| 8,179,682 | B2 * | 5/2012 | Cremer ................ H05K 1/0275 361/748 |
| 8,530,118 | B2 | 9/2013 | DeVoe et al. |
| 8,738,806 | B2 | 5/2014 | Kwon et al. |
| 2005/0163637 | A1 | 7/2005 | Chang et al. |
| 2008/0044127 | A1 | 2/2008 | Leising et al. |
| 2009/0218519 | A1 | 9/2009 | McLeod |
| 2009/0310905 | A1 | 12/2009 | Riester et al. |
| 2010/0027956 | A1 | 2/2010 | DeVoe et al. |
| 2010/0142896 | A1 | 6/2010 | Riester et al. |
| 2011/0082250 | A1 | 4/2011 | Wolter |
| 2011/0135248 | A1 | 6/2011 | Langer et al. |
| 2013/0056910 | A1 | 3/2013 | Houbertz-Krauss |
| 2013/0202488 | A1 | 8/2013 | Langer et al. |
| 2014/0249325 | A1 | 9/2014 | Wolter et al. |

FOREIGN PATENT DOCUMENTS

| | | |
|---|---|---|
| WO | 2011/044606 A1 | 4/2011 |
| WO | 2011/098460 A1 | 8/2011 |
| WO | 2012/143070 A1 | 10/2012 |

OTHER PUBLICATIONS

Doany F E: "Power-Efficient, High-Bandwidth Optical Interconnects for High-Performance Computing", IEEE HOT Interconnects Symposium, Santa Clara, CA, USA; Aug. 23, 2012.

Doany F E et al.: "Dense 24 Tx + 24 Rx Fiber-Coupled Optical Module Based on a Holey CMOS Transceiver IC", ECTC 2010, pp. 247-255.

Rylyakov A V et al.: "A 24-Channel 300 Gb/s 8.2pJ/bit Full-Duplex Fiber—Coupled Optical Transceiver Module Based on a Single "Holey" CMOS IC", IEEE JLT, 2010 (978-1-55752-884-I/10).

Houbertz R et al.: "Optoelectronic printed circuit board: 3D strcutures written by two-photon absorption"; Abstract in Proc. SPIE 7053, 70530B (2008).

Fjelstad J: "Rethinking the Hierarchy of Electronic Interconnections", IPC Outlook (2012).

Kumpfmueller J et al.:"Two-photon-induced Microfabrication of Flexible Optical Waveguides", JLMN Journal of Laser Micro/Nanoengineering 6(3) (2011) 195-198.

Bichler S et al.: "Functional flexible organic-inorganic hybrid polymer for two photon patterning of optical waveguides", Optical Materials 34 (2012) 772-780.

Schmidt V et al.: "Application of two-photon 30 lithography for the fabrication of embedded ORMOCER waveguides", Proceedings of SPIE, International Society of Optical Engineering, USA, vol. 6476, Jan. 22, 2007.

Langer G et al.: "Two-Photon Absorption for the Realization of Optical Waveguides on Printed Circuit Boards", Proceedings of SPIE, International Society of Optical Engineering, USA, vol. 6475, Feb. 8, 2007.

Schmid G et al.: "Experimental demonstration of the robustness against interference of optical interconnects on printed circuit boards", 2010 IEEE Photonics Society Winter Topicals Meeting Series (WTM), Jan. 1, 2010, pp. 93-94.

* cited by examiner

Process sequence 1

Application of Optical material

Formation of waveguide

UV cure

Application of Optical material

UV pre cure

Formation of waveguide

Removal of substrate

Optical module with sacrifical substrate

Optical module

Fig. 6 IIIa

Fig. 6 IIIb even with free-space optics.

OPTICAL PACKAGE AND A PROCESS FOR ITS PREPARATION

BACKGROUND OF THE INVENTION

The present invention is made in the field of optical interconnect technologies to advance optics into the module and chip level. The introduction of optical links into High Performance Computing (HPC) is a future option to allow scaling the manufacturing technology to large volume manufacturing. This will drive the need for manufacturability of optical interconnects, giving rise to other challenges that add to the realization of the interconnection. The present invention allows the creation of optical components on module level, integrating optical chips, laser diodes, or PIN diodes as components in a way which is comparable to SMD components used for electrical components.

Today's communication infrastructure is tightly connected to technological advances in computing, data storage, "big data" applications, and optical transport. The amount of data that is being transported has reached unseen and ever increasing volumes. Reducing power consumption on the processing side would trigger a cascade effect that further contributes to a reduction of power consumption. One of the designated technologies for advancing energy-saving computing systems is moving optical interconnects closer to the processor. The present invention proposes a means for manufacturing optical interconnects that allows scaling to high-volume manufacturing, as it is needed for proliferation of optical interconnects into the optical package, by an improved connection design of the optical components, thereby decreasing the necessity of accuracy in component mounting.

The evolution of electrical, electronic, and optical systems started with simple devices that were composed of individual parts joined together to perform a designated task. When the tasks got more elaborate, the systems got more complex and a more structured way of designing and manufacturing systems is required. This need was accompanied by technical evolution that allowed the condensation of functions into smaller, more integrated parts, e.g. integrated circuits (ICs). These ICs then were assembled on a substrate, which served as mechanical and electrical interconnection.

The interconnect hierarchy (Pinnel, M. R., Knausenberger, W. H., "Interconnection System Requirements and Modeling", AT&T Technical Journal, 66(4), July/August 1987) describes the modularization of the connections to be made between the different levels of integration in the system. Interconnect Level 0 represents the interconnections of the single components on the chip, interconnect Level 1 the chip-to-package interconnections to form the IC package, interconnect Level 2 stands for the assembly of components to the printed circuit board (PCB), on interconnect Level 3 circuit boards are connected to racks, or multiple PCBs are connected to each other, and interconnect Level 4 is the wiring and cabling connection in the cabinet. On interconnect Level 5 cabinets are connected to each other, interconnect Level 6 connects the collection of cabinets with the "outside", e.g. as connection out of a data center. Each integration level typically requires different types of interconnects. The present invention focuses mainly on interconnect Levels 1 and 2, which typically are similar in nature and, hence similarly created, but without excluding other Levels.

Data and power transport connections between different components in a system can be achieved through physically linking them. These links can be connected by hardware or materials, respectively, or it can be wireless. In the electrical domain, typical representations of material connections are solder joints in pin-in-hole and surface mount technology, galvanic connections, and welded or screwed contacts (in PCB Assembly) and connectors (to connect PCBs with larger components or cables). Wireless connections make use of electrical fields for data and/or power transport are, however, only used where not directly contacted by material. Only material connections shall be considered in the following.

A typical example for an interconnect on Level 2 is the soldered connection of an electrical component to the printed circuit board (PCB), which today is commonly attached in surface mount technology (SMT). Large components may be screwed to the PCB to enhance mechanical stability; this mechanical connection may also be an electrical connection (e.g. for ground). The large variety of interconnects results from the fact that the nature of electrons allows low-loss connectivity using all these different forms of interconnects. Standardization of manufacturing processes and materials has helped to advance the technology over the past 50 years to a point, where large volumes of interconnects can efficiently be created for even modestly complex products.

In the optical domain, similar representations exist: optical interconnects are usually material connections of light guides for enabling optical data and power transport; wireless transfer is represented by free-space optics. In the electrical domain, many different realizations of interconnects have been used for designing and building products. The number of optical interconnect types actually in use is lower as optical interconnects are much harder to manufacture efficiently in high volumes. In particular, the realization of interconnects on chip, package, and board level has been successful only in applications where electric interconnects could not compete for technical reasons, like bandwidth requirements, interference, and interconnect density. While means for creating low-loss optical connections on the chip, the package and the board level are known, the economically feasible realization has been a more difficult task. The nature of photons requires a more precise way of addressing the interconnect realization, which usually requires more precise alignment, and more complex interconnect designs, resulting from the available 2D technologies. As cost and energy consumption need to be taken into the equation, the manufacturability of the optical interconnects will be added to the list of requirements for volume manufacturing.

In the recent past work on the TERABUS system by IBM, the opportunities of optical modules were shown that are surface mount compatible, see Doany, F. E., "Power-Efficient, High-Bandwidth Optical Interconnects for High Performance Computing", IEEE HOT Interconnects Symposium, Santa Clara, Calif., August 21-23, Doany F. E. et al., "Dense 24 Tx+24 Rx Fiber-Coupled Optical Module Based on a Holey CMOS Transceiver IC," ECTC 2010, pp. 247-255, and Schow, C. L. et al., "A 24-Channel 300Gb/s 8.2pJ/bit Full-Duplex Fiber-Coupled Optical Transceiver Module Based on a Single "Holey" CMOS IC," IEEE JLT, February 2011. The chip was mounted on a substrate carrier allowing it to be assembled like an electrical SMT device. The interconnection of the "holey" optochip to the waveguides was done using free-space optics with a lens arrangement, requiring (a) additional alignment steps to align the lens array with the mirror array reflecting the light out of the plane of the waveguides, (b) creation of the mirror array using laser ablation (which is a rather "messy process"), and (c) the alignment of the chip to the lens array. By eliminating the lens array, the need for total internal reflection optics on the waveguides and elimination of the alignment of parts a much simpler process seems possible that allows an even more manufacturable process to be implemented.

The creation of optical interconnects has been addressed by many groups over the past decades, mainly in the form of optical waveguides (OW). Waveguides were created using technologies like photolithography, hot embossing/micro molding, laser ablation, or laser direct writing. Other methods include photo bleaching, ion diffusion, and two-photon absorption (TPA) using non-linear optics (Houbertz, R. et al., Proc. SPIE 7053, 70530B (2008)). While some of the technologies for making waveguides have reached a level of sophistication that would allow the transfer to volume manufacturing, further challenges remain for integrating these waveguides into existing electrical solutions. As optical waveguides represent only one portion of the functions required in an optical system, additional development needs to be done to account for the complete system to deliver an added value to the final product.

These waveguide manufacturing technologies can in principle be used for achieving optical connectivity, but it will be hard for most of them to scale to high volume manufacturing. This is true not only for multi-mode waveguides, but in particular for single-mode waveguides. The prime reason is the required precision of the alignment of the optical components to the waveguides. State-of-the-art assembly equipment is capable of both, handling substrates and dies, but will be very slow and costly when sub-micron precision is required. This is critical for scaling to large volumes of product. In addition, the alignment of more than one input/output (I/O) from an optical arrangement, an optical chip or a laser bar will be even harder than for a single I/O. Current state-of-the-art in assembly is active alignment, where the device needs to be powered up and emit/receive light like in live operation. While active alignment is common practice, passive alignment is the preferred choice as it is faster and simpler to implement.

However, the main and fundamental challenge of creating optical interconnects (OI) has not been addressed adequately.

To understand the challenge better, a look to the electronics manufacturing industry is helpful. Scaling of manufacturing of products to high volume manufacturing has been demonstrated by this industry. It could also serve as a role model for the optoelectronics industry. Electronics manufacturing has come a long way of putting more computing power into silicon, and more integration capability into Level 1 and Level 2 packaging. Enabling the OI to be efficiently manufactured will allow optical technologies to advance into interconnect Levels 0 to 2. Extending the idea, it might be helpful to consider various alternatives of interconnecting components on different interconnect levels.

The interconnect hierarchy (see Pinnel, M. R. et al., above and Fjelstad, J., "Rethinking the Hierarchy of Electronic Interconnections," IPC Outlook, 28 Dec. 2012 logically partitions a system into various levels that are interconnected by physical connections. The model had been created and is used for electrical connections, but may well be applied to understand the system partitioning in the optical domain as well. It is helpful to understand the complexity that interconnects may have on the respective levels, or, in other terms, on which level complexity is best aggregated to eliminate the need for complex interconnects. As only a few standards exist today with respect to optical interconnections, let alone system design, variations of system concepts will persist, and today's solutions will remain specific to individual systems. In the following, two examples are given that outline the concept.

On Level 1, optical chips are connected to their package. The chips might come with only one optical I/O, or with many. Thus, either a single interconnect needs to be formed, or multiple. In both cases, the optical output of the chip needs to be precisely aligned to the waveguide or the free-space optical system comprising lenses. A repeatable and standardized manufacturing process will be required to deliver optical packages that can be used in large-scale systems. The complexity of the technical solution will inherently influence the scalability of the system. When making the decision for a particular solution, the manufacturability of the optical interconnect is determined by (a) how light is delivered (input), (b) how light needs to be taken from the input to the output, (c) how light is delivered at the output of the waveguide (or free-space optics), (d) the environmental conditions under which the module needs to operate, (e) the reliability (MTTF, MTBF), (f) manufacturing yield, and (g) cost.

On Level 2, the module-to-PCB interconnect level, the optical connection between the package and the substrate is formed. The main challenge is the registration tolerance that needs to be reached during assembly and maintained during operational life. Also, the number of interconnects to be simultaneously formed will be critical, as multiple I/Os will require a precise positioning of interconnects with respect to each other. Thus, the module I/Os are imposing tight design rules for the counterpart on the substrate/PCB side, which needs to be ideally matched. While solutions like arrayed lens coupling can be used, the registration of the module to the lens array is still critical. In addition to the proposed free-space lens array coupling solutions, optical connectors might be used. These again will require an optical interface to be created to them, which merely shifts the problem, and adds more complexity to the process. On Level 2, the reduction of the number of process steps is even more critical, as Level 2 is the most cost sensitive interconnect level in the value chain.

An alternative and potentially more attractive approach on Level 2 is the separation of the electrical and the optical interconnects, which would lead to system concepts where optical connectivity on Level 2 is provided through optical cables. A similar concept has been described in Fjelstad J. C. et. al, "Direct-connect integrated circuit signaling system for bypassing intra-substrate printed circuit signal paths", U.S. Pat. No. 7,307,293, 11 Dec. 2007 for high frequency electrical signal transmission.

Existing manufacturing processes for optical waveguides have not been able to meet all requirements for high volume manufacturing of integrated optical modules. In order to allow the elimination of most of the drawbacks, the present invention provides a new interconnection technology and manufacturing process flow that, moreover, is scalable to volume manufacturing. In addition to the new way of creating the waveguide structures, a fundamental paradigm shift for the process sequence for the assembly process is proposed. The process of the invention can be used for creating optical components that can be used like electrical modules during assembly, while exhibiting the performance of optical modules or optical multi-chip modules (OMCM). The paradigm shift becomes possible due to a process which provides, at the time of creating the optical interconnection(s) of the respective components, a mechanical fixation of these components. Consequently, mechanically stable optical modules can be provided, which may even lack a substrate, and their preparation does not require more than an active or passive structure having at least one optical input and/or output as the optical equipment, and a chemical material which can be structured by TPA and which, upon at least one curing step, provides the mechanical stability of the optical module.

SUMMARY OF THE INVENTION

Thus, the present invention provides a package including optical components, comprising:
(i) at least one structure, the structure having at least one optical input or output,
(ii) at least one optical interconnection, optically connected to the at least one optical input or output, and
(iii) a component in which the at least one optical interconnection and the at least one optical input or output is embedded, with the interconnect's mechanical properties ranging from mechanically rigid to mechanically flexible,
wherein (a) the component (iii) embedding the at least one optical interconnection and the at least one optical input or output and the at least one optical interconnection (ii) are made from a chemically identical material, wherein the material of the at least one optical interconnection has a different primary and/or secondary structure, compared to the material of the component embedding the at least one optical interconnection and the at least one optical input or output, (b) the component (iii) embedding the at least one optical interconnection and the at least one optical input or output and the at least one optical interconnection (ii) have a difference in their refractive indices of at least 0.0004 or of at least 0.0015, preferably up to about 0.020 and more preferably between 0.0020 and 0.015 at 850, 1310, and 1550 nm, respectively, and (c) the at least one optical interconnection (ii) is mechanically fixed by the component (iii) embedding the at least one optical interconnection and the at least one optical input or output.

The difference in primary structure may be a different degree, mainly a higher degree of crosslinking, or may be a result of a re-arrangement. The difference in the secondary structure may be based on a different order of chemical components within the network or other structure within the chemical system of material of the at least one optical interconnections, compared to that of component (iii). A chemical proof of the nature of the different primary and/or secondary structure is difficult; however, the existence of a different refractive index between the materials of component (iii) and the optical interconnection(s) (ii) is sufficient to prove that any such difference in primary and/or secondary structure must be present.

In a first preferred embodiment of the invention, the material of component (iii) has a bending strength of at least 50 MPa, preferably of at least 60 MPa, measured by a 3 point bending test. In another preferred embodiment, the material of component (iii) is flexible. In a third preferred embodiment, the material of component (iii) is extensible. This extensibility can be in the range of up to 2 to 10%, or even up to at least 30%, if the material (iii) has a thickness of 0.1 to 2 mm. In a more preferred embodiment, the material of component (iii) has a bending strength of at least 50 MPa, preferably of at least 60 MPa measured by a 3 point bending test and is flexible. In another preferred embodiment, the material of component (iii) has a bending strength of at least 50 MPa, preferably of at least 60 MPa measured by a 3 point bending test, and is extensible, e.g. as outlined above. In still another preferred embodiment, the material of component (iii) is flexible and extensible, e.g. as outlined above. In an even more preferred embodiment, the material of component (iii) has a bending strength of at least 50 MPa, preferably of at least 60 MPa measured by a 3 point bending test, is flexible and is extensible, the extensibility being preferable in the range of up to 2 to 10%, or even up to at least 30%, if the material (iii) has a thickness of 0.1 to 2 mm.

BRIEF DESCRIPTION OF THE DRAWINGS

The invention is further illustrated by figures, wherein
FIG. 1 indicates five different flow schemes of the inventive process.

DESCRIPTION OF PREFERRED EMBODIMENTS

Figure 1:
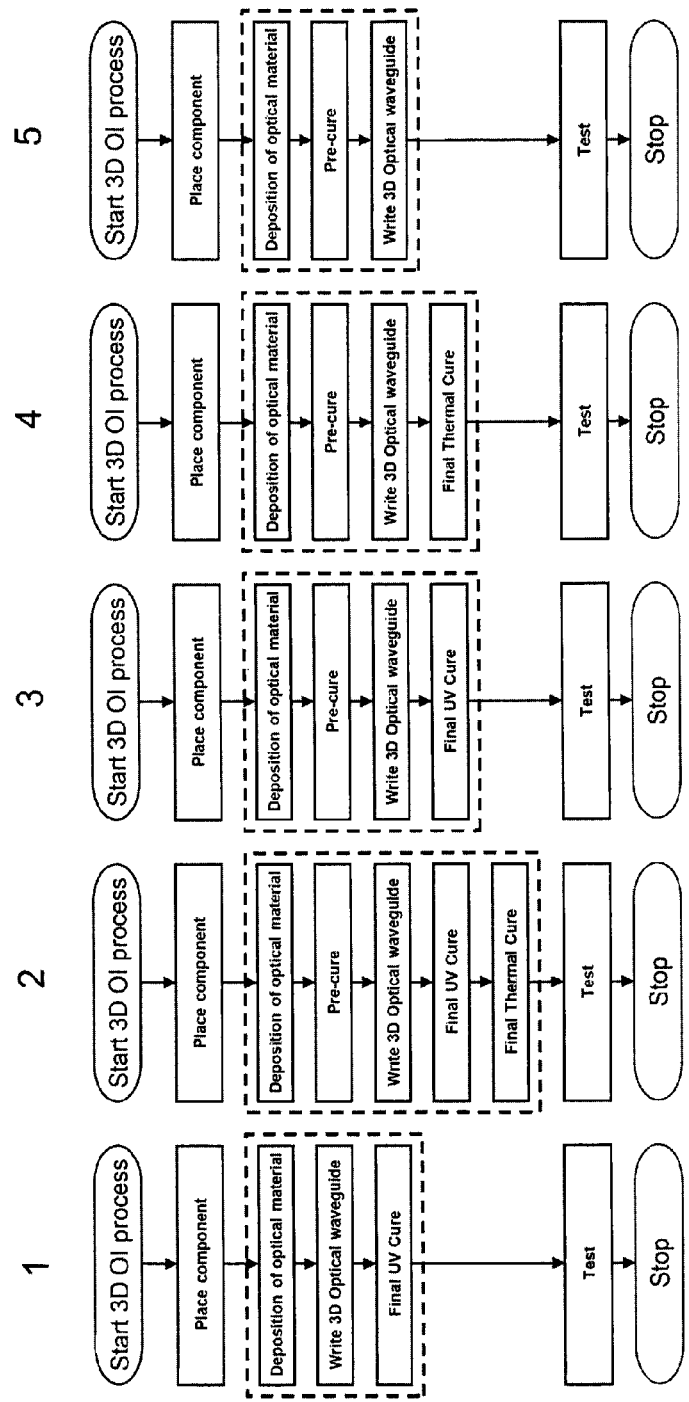

According to the present invention, the following definitions are used:
"TPA" is the abbreviation of two-photon absorption, however, its meaning within this application shall also comprise multi-photon absorption processes (processes wherein more than 2 photons are absorbed). "2-PP" is the abbreviation of two-photon polymerization, i.e. the polymerization reaction induced by TPA. Likewise, multi-photon polymerization (abbreviation "M-PP") is the polymerization reaction induced by multi-photon absorption processes. The term "2-PP" as used herein shall also include multi-photon polymerization processes.

A "package including optical components" can be any package comprising at least the above mentioned components (i) to (iii). At the most simple end, it can consist of a rigid or flexible film or a rigid or flexible double layer or a multilayer of films, wherein the optical structure is at least partly embedded within the film. The optical interconnection has been prepared by TPA "writing" within the film, and it is in optical connection to an input or output of the optical structure.

A "structure having at least one optical input or output" means any active or passive optical device or component. Active optical devices can be, without being restricted thereto, lasers, photodetectors, photodiodes (receivers), light emitting and/or light absorbing devices which moreover might be able to process light, e.g. into electrical or mechanical signals, mirrors, e.g. rotatable mirrors, LEDs, OLEDs, VCSELs (vertical cavity surface emitting lasers), fiber lasers, edge emitters and the like. Passive optical devices can be, without being restricted thereto, light-guiding or beam forming structures, e.g. glass and other fibers and the like.

The package including optical components may comprise one of such structures only, or two or a multiplicity thereof. Light may be transmitted from an optical output of such a structure to the outside of the package, or to the optical input of another of said structures. Instead or additionally, it may be transmitted from the outside of the package to an optical input of a respective structure. The number, the shape, and the form factor of optical structures within the package is not restricted.

An "optical interconnection" as defined in (ii) above is a light guiding structure which enables the light to be transmitted from an optical output of one of the said structures to an optical input of another of the said structures, or to the outside of the package, or from the outside of the package to an optical input of one of the said structures. The optical interconnection can have a simple "line" structure, having a constant shape and diameter over the required length, or can change its shape and/or its diameter, in order to better match a respective optical input or output of the respective structure, e.g. can be tapered. It can be straight or bended/curved in two or three dimensions. It can be a single waveguide, or a waveguide grating, extending in two or three dimensions. Further, the optical interconnection may interconnect more than two inputs/outputs, e.g. may have the form of a Y connector or a Y coupler or a cross connector. The curvature of a curved optical interconnection is low in general, e.g. in the range of about 2 m radius, but this is not a necessary feature. It can be lower or higher, dependent on the respective materials being used as well as on the processes employed. Its diameter will be dependent on the requirements, e.g. 9 µm physical core diameter (resulting in around 10 µm mode field diameter) if a single-mode waveguide application is chosen, however, it is not restricted to single-mode, but it can be also applied for multi-mode application, thus having much higher diameters, ranging from 11 to 200 µm, preferably 30 to 150 µm, dependent on the application wavelength.

The optical interconnection being "optically connected to the at least one optical input and/or output" does not require a direct physical connection; in some cases, it is sufficient if there is a distance between the optical input/output and the physical end of the optical interconnection. The light coupling can be performed using e.g. a Bragg grating, a prism, or a diffractive "butt coupling" wherein the amount of the distance, if any, is selected in the light of the numerical aperture, e.g. dependent on the waveguide. Distance can range from zero (butt coupling, just dependent on the surface finish of the two elements) to, for example 10 cm (in case of free-space coupling). Dependent on the application and the optics chosen, free-space coupling can also exceed 10 cm. The gap between the elements can be either filled by material or it can be an air gap.

The "component in which the at least one optical interconnection and the at least one optical input or output is embedded" is made from a material which has been cross-linked using light and/or heat. The optical interconnection, which has been made from the identical material, has a higher refractive index and is assumed to have a higher cross-linking degree, compared to the embedding component, which is a result from the TPA structuring of the optical interconnection, as outlined in more detail below. Due to the cross-linking ("curing", mainly "light-induced curing") step, the material of the component has a mechanical stability which is sufficient to fix the essential components of the inventive package to each other. The bending strength can be in the range of 50 or 60 MPa, if measured by a 3 point bending test, but can be much higher. In specific embodiments, it could be found that upon proper selection of the material used for the said component, it may instead or further have a high elasticity and stretchability/extensibility, which can be at least 2%. Therefore, the component in which the at least one optical interconnection and the at least one optical input or output is embedded does not only serve as the source for the generation of the optical interconnection, but also serves as a mechanical connection between the components, either having a high mechanical strength and/or being flexible and extensible. In the first case, the packages obtained with such a material will be very resistant against mechanical shocks and other affects. In the last case, films made of the material and including the waveguide written by TPA or multi-photon absorption can be extended or bended, thus opening the possibility for even more sophisticated optical package constructions. If the materials have both, a high mechanical strength (bending strength) as well as high tensile strength and/or extensibility, they do not show the brittleness of many materials having a high bending strength, but can be bended without breaking under high load. Moreover, the said component may be self-supporting, e.g. in the form of a flexible or rigid film, with thicknesses preferably ranging from 20 µm to 2 mm, preferably 80 µm to 2 mm such that it can be used without a respective substrate, if required or desired.

The package of the invention may comprise a substrate, wherein the at least one structure (i) is directly or indirectly mounted on the substrate and/or wherein the component (iii) can be in direct contact to the substrate. This substrate may be part of the final package, e.g. if it is a board or an IC or a silicon chip, possibly comprising electrical equipment (buried electrical connections, contacts and the like). Alternatively, it may be used as a support merely for mounting the one or more structures having at least one optical input and/or output and/or for applying the material for the component (iii) and the at least one optical interconnection (ii) which is usually liquid or pasty prior to cross-linking. In such a case, it can be prepared from a material which can be sacrificed, e.g. dissolved in a proper solvent, or it is later separated from the or one layer of component (iii).

In a specific embodiment, the package includes a socket or the like. Further, it may comprise a wall surrounding an inner space. In these embodiments, the wall and/or the socket each may be one of the structures (i), and if it is the wall, its optical input/output may be a window or connection by which light may be transmitted from the outside of the wall into its inside. In this case, it is preferred that the package includes a second or a multiplicity of additional structures (i) within the wall, and light is transmitted from or to the window or connection.

Figure 5:
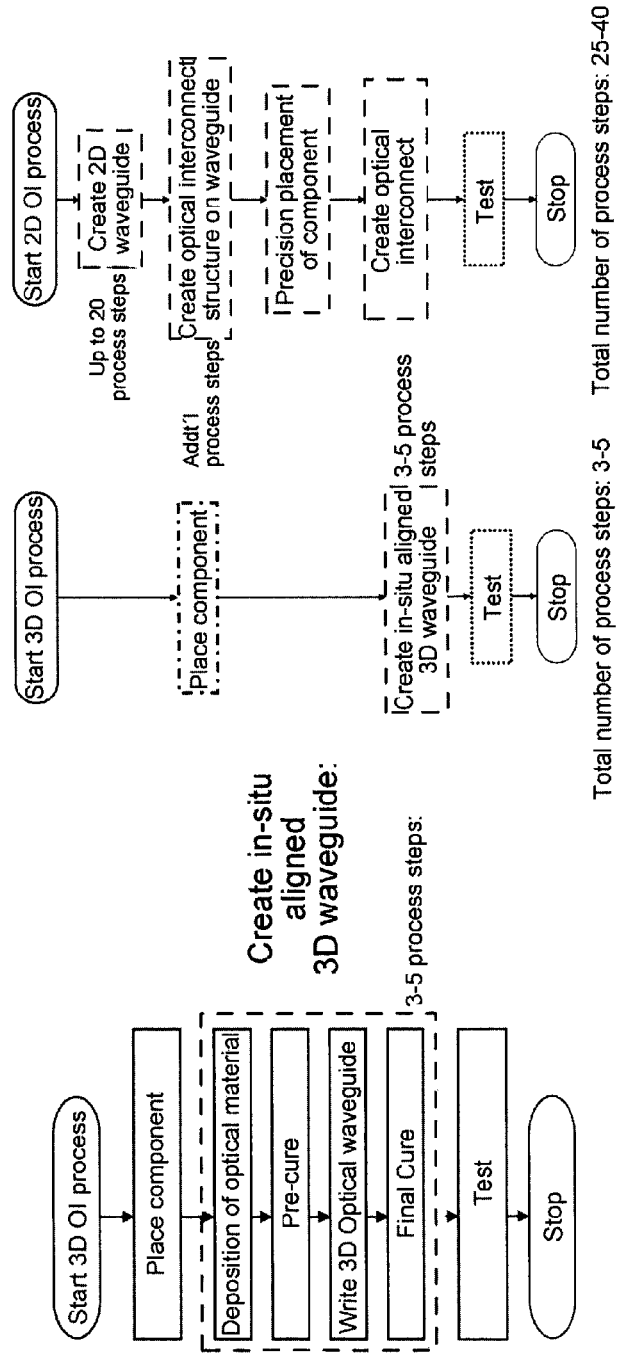
FIG. 5 illustrates the saving of steps by the inventive process.

A number of possible process flows for creating 3-dimensional optical interconnect structures are outlined in FIG. 1. The advantage of the process of the invention is that the large number of process steps required for generating waveguide structures on planar substrates is significantly decreased, from more than 40 process steps to as little as 3 necessary steps, namely the deposition of a material into which the optical interconnect structures are to be written, a writing step and at least one curing step (either as a pre-cure, see "process 5" of FIG. 1, or a final cure, see "process 1" of FIG. 1, or both, see e.g. "processes 2 to 4" of FIG. 1). The process sequence is significantly shorter than the one for typical processes, see e.g. FIG. 5, uses less process material, less solvents, and less energy. In addition, the technology enables the creation of 3D waveguide structures not attainable with legacy processes. One major advantage of the process is the fact that the TPA "writing" step is not only capable of producing the required optical interconnection(s), but at the same time, may also create a number of additional active or passive optical components, directly from the material capable of being photochemically polymerized by TPA or multi-photon absorption. Another important advantage is the simplicity of connecting different optical inputs/outputs, due to the possibility of easily changing the diameter or outer shape of the optical interconnection such that it matches the shape of the input/output. This allows a relatively high inaccuracy in the step of mounting the optical structure(s) (i) to the substrate. By measuring the position thereof, e.g. by inferometry with white light, it is possible to determine the position of the said structure(s) and their possible tilting, and to adapt the position of the optical interconnection(s) in any of the x, y, and/or z direction accordingly, via introducing the respective data into the data memory of the light guiding device for TPA writing.

The process allows active optical components like lasers, VCSELs, PIN diodes, or optical chips as well as passive optical components and combinations of active and passive optical components to be interconnected with the corresponding receiving devices.

The process for the preparation of a package having optical components, according to the present invention, may include the following steps:

(a) Providing a substrate suitable for solidification of a liquid or pasty material thereon, the substrate being optionally equipped with one or more structures having at least one optical input and/or output, and mounting at least a second structure on the substrate, the structure having at least one optical input and/or output, or (a') Providing a substrate suitable for solidification of a liquid or pasty material thereon, the substrate being equipped with one or more structures having at least one optical input and/or output, (b) filling an area in the vicinity of the structure with a material capable of being photochemically polymerized by TPA or multi-photon absorption, such that the at least one optical input and/or output is covered;

(c) providing one or more optical interconnections, the or one of the optical interconnections being in direct optical contact with the at least one optical input and/or output of at least one of the structures, and also providing any other structure having at least one optical input and/or output which shall be present in the completed package having optical components, by structuring the material mentioned under (b) with TPA or multi-photon absorption and curing same in such a way that the at least one optical interconnection and each of the other structures having at least one optical input and/or output are formed, wherein the step of curing the material can be performed prior or after structuring the material with TPA or multi-photon absorption.

This means that each and any active and passive optical elements to be added to the package after step (a) or (a'), respectively, is prepared by TPA or multi-photon absorption, and therefore, even more complicated and sophisticated packages can be prepared with a very low number of process steps.

In step (a) or (a'), a substrate is provided, e.g. a carrier, for example a circuit board, which carries at least one structure having at least one optical input and/or output. Alternatively, the said structure and/or additional such structures is/are assembled or mounted on the said substrate. The substrate can be made from organic materials, e.g. a film made of polyethylene or polyethyleneterephthalate, polyimide, or Kaptone, but preferably, at least its surface is inorganic. The inorganic substrate or substrate surface can be an (electrically conducting) metal, or an isolating or semiconducting or ferroelectric material. Examples are silicon, dielectric materials like silicon oxide, silicon nitride, glasses, ceramics, PZT (lead zirconium titanate), or the like. Under these, glasses, ceramics and oxides are preferred, due to the presence of OH groups or oxygen atoms having free electron pairs on the surface thereof which can interact with specific materials capable of being photochemically polymerized by TPA or multi-photon absorption, as outlined below in more detail. In step (b), an area in the vicinity of at least the structure having at least one optical input and/or output is filled with a material capable of being photochemically polymerized by TPA or multi-photon absorption. By this measure, at least one optical input and/or output of the structure should be covered, and at the same time, the material is arranged in such a way that at least one optical connector can be created, guiding light from or to the said optical input and/or output to or from another optical input and/or output inside or outside the package. The said material can be applied to the substrate as required or desired, e.g. by dipping, spin coating, doctor blading, printing, or dispensing, respectively. More precisely, any application method can be employed to deposit the material to the substrate. This material later will have the function of one or more optical interconnection(s) (e.g. waveguide(s)), optionally of additional optical structures or elements), and of the surrounding ("cladding") material which provides mechanical fixation and stability. It may also serve as glob-top and/or underfill. It is therefore applied in a sufficient amount and thickness such that the required structures can be "written" therein. In step (c), the material capable of being photochemically polymerized by TPA or multi-photon absorption is subjected to a light-induced and/or thermal curing operation whereby the material is slightly or even fully cured/dried. Prior or after this operation or after a first one of both steps and prior to the second one, the optical interconnection(s) is/are written into the material using a two- or multi- (e.g. three- or even more) photon absorption structuring process. This process allows the optical interconnection(s) to be precisely aligned with the designated optical input or output location. It is evident that the alignment and its accuracy is independent of the assembly process. This leads to the situation that for the assembly process existing assembly equipment may be used as it is used in semiconductor industry, and no comparably slow and costly equipment is required for creating the optical component-to-waveguide link in parallel to the assembly of the electrical parts. The precision alignment is possible as the geometry of the optical chip is well known, or it is measured during the process of the invention using known methods, and can be used for precisely aligning the TPA laser with the optical output.

In specific embodiments, a socket may be used on which the structure having at least one optical input and/or output is mounted. Such a socket may provide additional electrical interconnections. The socket frame may have optical windows at specified locations that can be easily identified in the alignment process. With the location of both end points of the optical I/O defined, the calculation of the optical interconnection(s) can be done in situ by geometrical optimization of the optical interconnection(s) with respect to insertion loss. Pre-calculated optical waveguide segments may be also used and connected in this process to reduce process time. The TPA structuring process allows multiple waveguides and even additional structures having at least one optical input and/or output to be created inside the material, within one step only, if desired. The waveguides may be arranged in parallel, they may intersect, and/or they may come in bundles to allow space multiplexing. The waveguides may be tapered (in situ) to account for differences in diameter of the optical I/O on either side of the waveguide. They may be multi- or single-mode, the latter allowing multiplexing/demultiplexing (MUX/DEMUX). After the waveguide and interconnect structuring has been completed, the remaining material can be polymerized to stabilize the waveguides inside the matrix, if desired. The completely polymerized package is mechanically stable and carries optical interconnects that connect the optical chip with the package, and it can be handled such as any electrical component in an assembly process.

According to a specific embodiment of the present invention, the preparation of an optical package may therefore include the following steps:
(a) Providing a substrate suitable for the construction of optical components or packages, mounting a structure on the substrate, the structure having at least one optical input and/or output, preferably selected from connections and slots for optical cables, e.g. a device having a surrounding wall like a socket or frame or receptacle, and introducing and mounting an optical device (e.g. an optical chip or a laser diode or other optical component) on the substrate, either within the structure, and preferably within the surrounding wall thereof, if present, or outside the structure, preferably in such a way that the optical input(s) and/or output(s) of the optical device are in vicinity to the optical input(s) and/or outputs) of the structure,
(b) filling a space between the optical device and the structure with a material capable of being photochemically polymerized by TPA or multi-photon polymerization, preferably such that the at least one optical input and/or output of the said structure is covered, and
(c) structuring the material with TPA or multi-photon polymerization and curing same in such a way that one or a multiplicity of optical interconnection/s is/are formed between at least one optical input and/or output of the optical device and at least one optical input and/or output of the structure, wherein the step of curing the material can be performed prior or after structuring the material with TPA or multi-photon polymerization.

The subsequently described details can be used for any of the methods for the preparation of the optical package of the present invention as well as for the optical packages themselves.

As outlined above, a socket, wherein also electrical interconnections are or have been created or realized, is for example mounted on a substrate, and an optical device, e.g. an optical chip is mounted within the socket, and some or the full space between the optical chip and the walls of the socket are filled with the material defined under (b). The material can be applied such that the optical chip is fully covered, in order to provide additional protection thereof against the environment, but this is not a necessary measure. Alternatively, the structure is a receiving device, an active or passive structure like MEMS, or an IC containing structure, mounted in a selected distance to the optical device, and a space between the optical chip and the structure is filled or covered with the material defined under (b). This can for example be performed via a printing process like, for example ink-jet printing, or by application of a liquid drop of the said material having the required volume.

The optical package obtained with the above steps can be used as it is, e.g. if the optical chip is fully covered with the material defined under (b), but instead, it can be further processed, e.g. by being moulded or sealed with plastic, or can be used within a larger assembly which is then separately packaged. Packaging can be made, for example comparable to electrical components, but of course, optical inputs and/or outputs to the environment must be kept free.

Figure 4:
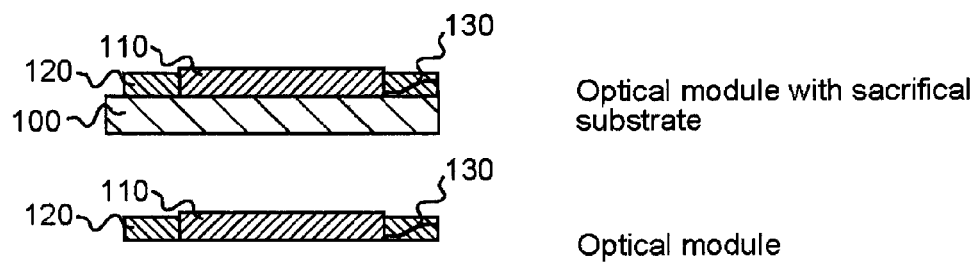
FIG. 4 illustrates the preparation of an optical module consisting merely of an optical component and an optical waveguide within a cured embedding material.

In one important alternative, the optical package obtained with the above steps is further processed by subsequently removing the substrate. The resulting device is a film made of cured material which previously was capable of being photochemically polymerized by TPA or multi-photon absorption, to which a structure having at least one optical input and/or output is fixed which is at least partly covered by this film, wherein an optical interconnection is present at least partly within the film, having the ability of guiding light from/to the at least optical input and/or output. This embodiment of the invention is depicted in FIG. 4. This alternative is possible due to the mechanical strength of the material defined under (b), having film thicknesses ranging from 1 µm to 2 mm, preferably from 1 µm to 500 µm.

A number of preferred process flow sequences of manufacturing an optical waveguide and interconnect according to the present invention are shown in FIG. 1. A further one is indicated below. They allow fully flexible manufacturing of optical waveguides in 3-dimensional space and can be reduced to a minimum of 3 individual process steps.

The process flow as outlined for the TPA process can be used for creating 3-dimensional optical interconnects, as mentioned above. This is helpful for multiple reasons. In the application described above, the feature can be used to account for misalignment in all three axes: x-y and height (z direction). The process sequence remains identical, only the programming of the waveguide structures needs to account for the change in depth through which the imaging laser light needs to travel.

This process is carried out separately from the die attach/placement and links the optical output location with the desired destination of the light signal. The distal end of the optical interconnection can be a standard connector, or fiber array connector, or a specified location in the frame, which serves as the base for insertion of such a connector. Prior to or after the waveguide polymerization process using TPA or multi-photon polymerization structuring, the matrix material is polymerized, thus creating a protective layer on the chip, much like a dam & fill process including, however, the optical interconnect structures from the chip to the connector.

Recently, a few publications showed the general possibility of preparing optical waveguides within a cladding from only one material. However, these materials still have disadvantages in respect to stability of the cladding. For example, S. Bichler, S. Feldbacher, R. Woods, V. Satzinger, V. Schmidt, G. Jakopic, G. Langer, W. Kern in Optical Materials 34 (2012) 772-780 describe a material which, after preparation of the waveguide therein, needs to be subjected to an evaporation step in order to stabilize the cladding. J. Kumpfmueller, K. Stadelmann, V. Satziger, Z. Li, J. Stampfel and R. Liska in JLMN Journal of Laser Micor/Nanoengineering 6(3), 195-198 (2011) describe a combination of a matrix and monomers dissolved therein wherein the matrix needs to be made thixotropic by using a rheology additive. No stabilization step of the matrix after the TPA step is disclosed.

The inventors surprisingly have found a number of different materials comprising groups which are organically polymerizable via TPA that overcome the above mentioned disadvantages and that are, therefore, strongly preferred as the material of step (b) above. These materials may have a high mechanical strength (bending strength) and/or a high tensile strength which is due to a high elasticity and/or extensibility of the material. They may include non-aromatic carbon double bonds, e.g. either insulated like in vinyl or allyl groups, or within sterically hindered structures like norbornenyl groups, or in the form of α,β-unsaturated carbonyl groups (Michael systems and the like), e.g. acryl or methacryl groups. Insulated carbon double bonds, as far as not sterically hindered, and α,β-unsaturated carbonyl groups are capable of being photochemically subjected to an addition polymerization, and therefore may constitute the only photochemically polymerizable groups. In a very important embodiment, at least part of the non-aromatic carbon double bonds may be part of chemical groups bound to silicon atoms of a polysiloxane or an organically modified silicic acid (hetero) polycondensate via Si—C bonds.

Such materials are known mainly under the trade name ORMOCER®s, and some of them are disclosed e.g. in EP 781 290 B1, EP 450 624 B1, EP 682 033 B1, EP 1 159 281 B1, EP 1 695 182 B1, EP 1 984 847 B1, EP 1 914 260 A1, WO 2003/037707 A1, WO 2011/098460 A1, WO2011/141521 A1 and WO 2013/053693 A1. Specifically, it could be found that inorganically condensable or condensed materials including Si—O—Si bridges as well as (meth)acrylate or norbornenyl groups containing residues in combination with thiol groups result in very flexible, expandable materials after TPA writing and curing (UV or thermal curing or both. This flexibility may be very high, e.g. films having a thickness between 20 μm and 2 mm may have a radius of curvature (radius of bend) in the range of less than 1 mm to 2 m.

A highly preferred embodiment of the present invention is the use of a substrate having an inorganic, OH groups or O atoms carrying surface, in combination with an inorganically condensable or condensed material including Si—O—Si bridges as the material of step (b). Such materials can often be regarded as organically modified (hetero)silicic acid polycondensates. Such polycondensates usually contain a certain number of free OH groups. If used as material (b), it exhibits a specifically strong adhesion to the substrate, increasing the strength of the optical package also in vertical direction, relative to the substrate surface.

The materials are usually liquid or (more or less, sometimes even highly) viscous, but in specific cases, they could be even solid. These cases are restricted to a very simple geometry of the package because they require the addition of the material capable of being photochemically photopolymerized by TPA or multi-photon polymerization by mounting it in the form of a block, instead of performing step (b). Therefore, in the main cases, the materials are not solid. They can be prepared by the so called sol-gel process from one or more monomer or oligomer silanes, which includes hydrolytic condensation of the starting materials. Surprisingly, even materials which can be regarded as "completely" condensed under the circumstances of the sol-gel process can be used in the process of the present invention.

The material has to be exposed to light in order to achieve optical functionality which is carried out using ultrashort laser pulses which are used to write the calculated optical structures into the material. In- and output of the chip and the optical contacts will be connected such that the transmitted light from the optical chip is guided almost loss-free to the right output.

For creating the complete optical functionality during step (c), the above two mentioned steps can be carried out in different ways, and moreover, additional steps can be added. These may differ dependent on the application scenario, mainly determining the performance to be achieved. All processes for step (c) which will be described in the following have in common that the optical material is deposited or attached to the different structures involved, or that the at least one of the said structures, e.g. the optical chip or at least one optical input or output thereof, can be completely embedded in the material. It is preferred that the optical structures are written via ultrashort pulsed laser light exposure, and the irradiation time is preferably selected between 100 and 500 μs, more preferred between 200 and 400 μs at a writing speed of between 0.5 and 10 mm/s, preferably about 1 mm/s. It has to be mentioned that the writing speed can even exceed 10 mm/s which is mainly determined on the chemical reactivity of the materials upon laser light exposure. It is important to note that there is no wet chemical development step (deletion of remaining liquid or pasty material surrounding the optical interconnection) in order to create the optical structures. However, thermal steps can be used to "develop" the optical structure (as, for example, in the case that SU-8, an epoxy based photolaquer, is used).

Figure 3A:
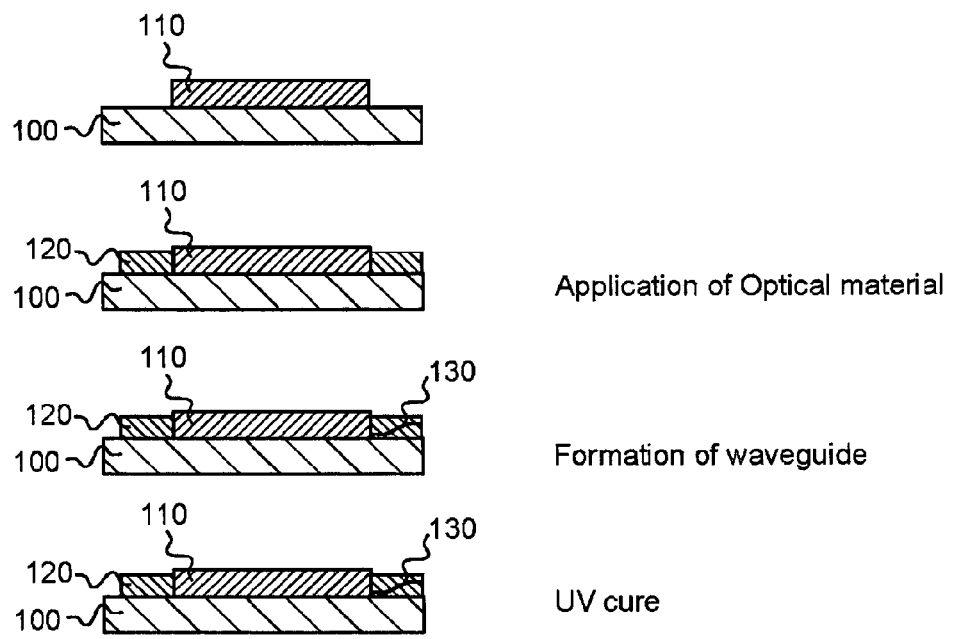

The preferred processes mentioned above for carrying out step (c) are outlined below:

Process 1 (the process flow and the construction of the optical package is diagrammatically shown in FIG. 3a)

1. The optical material is liquid, and the light-guiding structures are defined by moving the ultrashort pulsed laser light focus through the material. The starting point for the movement of the focus can arbitrarily be selected.
2. After that, the complete assembly or ensemble is exposed to light, preferably UV light. The wavelengths which can be employed for that will preferably vary between 200 and 500 nm, they are, however, more preferably around 365 nm (I line). The time of irradiation is not critical. This process is depicted as "Process 1" in FIG. 1. The "final UV cure step" can be replaced in "Process 1" by a thermal curing step, if required or desired e.g. as follows: The complete assembly (ensemble) is then exposed to thermal energy (furnace, hotplate, ...) for a certain time (minutes to hours) at temperatures between 80 and 170° C., dependent on the material used for the optical structure, however, higher or lower temperatures might also be used. In specific embodiments, the two curing steps (by light and thermal) can be performed one after the other, in an arbitrarily selected sequence.

Processes 2 to 4

1. The optical material is liquid and exposed to light, preferably UV light, for a selected time. The time of irradiation is not critical. Surprisingly, the time can be selected such that saturation of the polymerization reaction takes place, but this is not a necessary measure. For example, exposure to light for 1 to 3600 s is possible, preferably 1 to 360 s. UV light wavelengths which can be employed for that can vary between 200 and 500 nm, they are, however, preferably around 365 nm (I line) ("procure step").
2. As step 1 of process 1.
3. As step 2 of process 1.

Figure 3B:
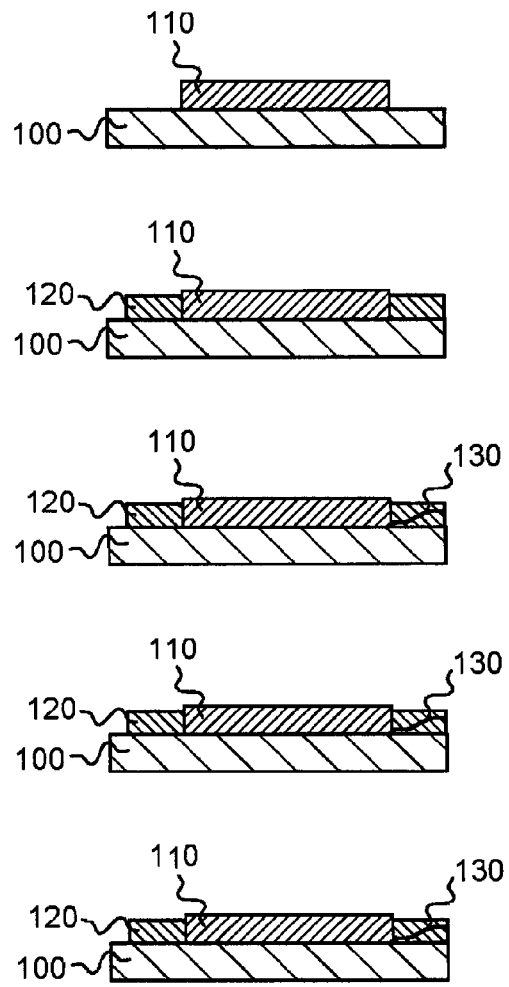
Figure 3C:
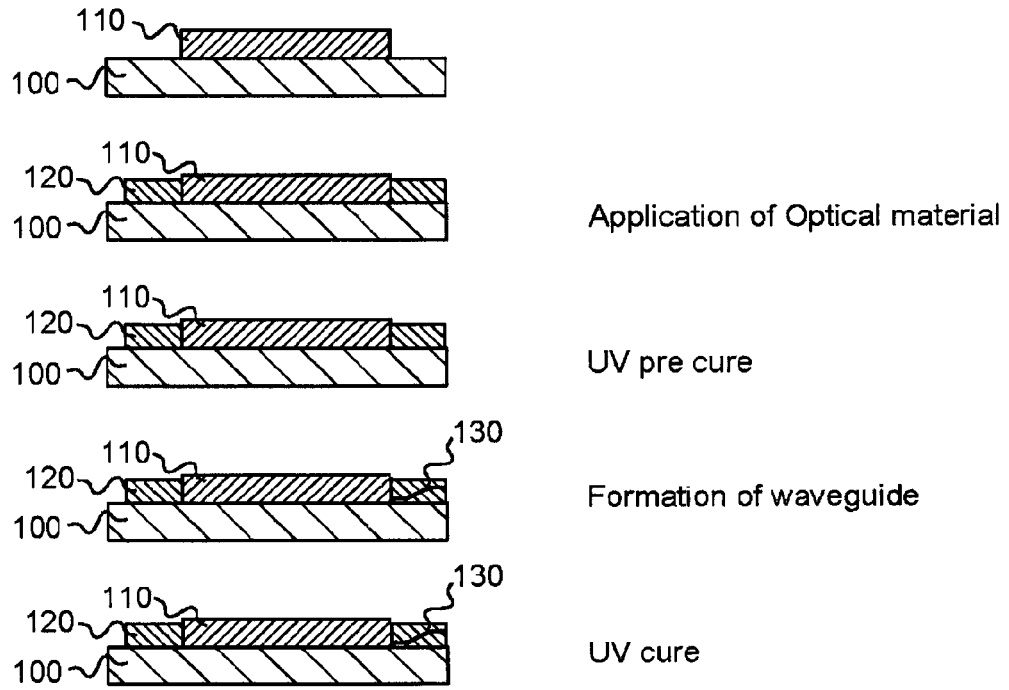
Figure 3D:
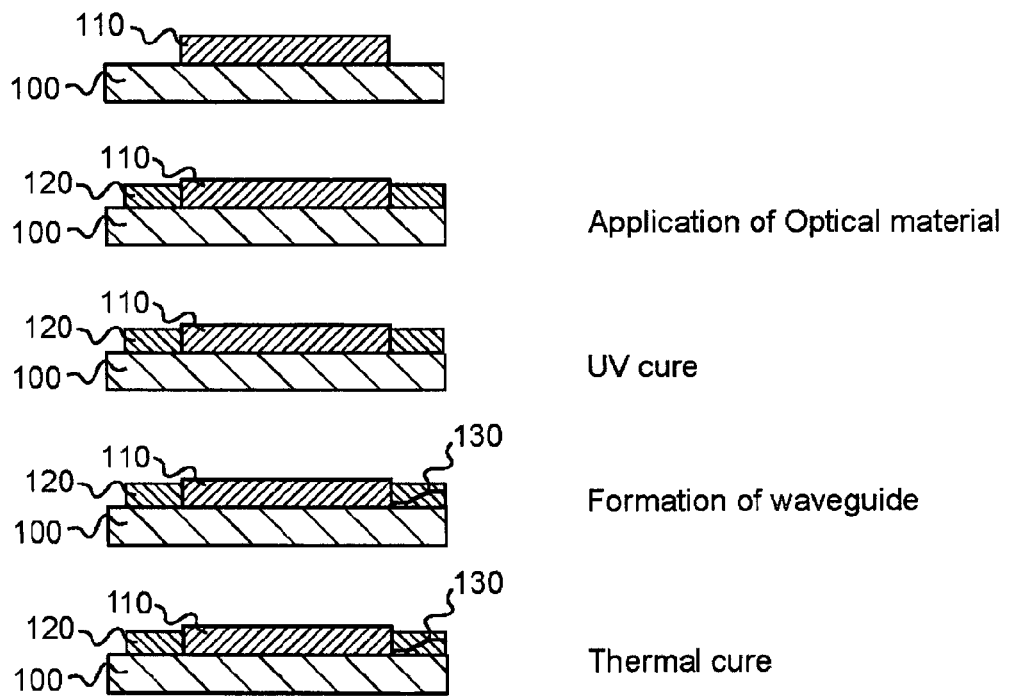

"Process 2" as depicted in FIG. 1 shows the variant wherein both curing steps are used, curing by (UV-) light and by application of heat, "Process 3" as depicted in FIG. 1 shows the variant wherein the complete assembly or ensemble is merely exposed to (UV-) light. "Process 4" as depicted in FIG. 1 shows the variant wherein the complete assembly or ensemble is merely exposed to heat. The process flows and the construction of the optical package of processes 2 to 4 are diagrammatically shown in FIGS. 3b to 3d.

Process 5
1. As step 1 of process 2
2. As step 2 of process 2.

Figure 3E:
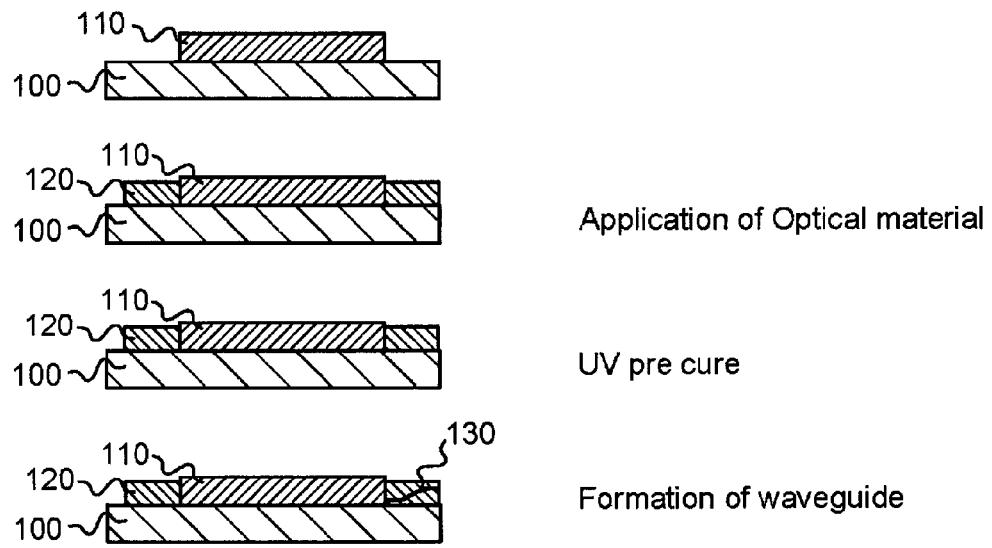

Note: since Process 2 uses a pre-curing step, additional curing after the "writing" step can be deleted without adverse effects, if the pre-curing step was performed such that the formation of a stable organic network was effectively obtained. This process is depicted as "process 5" in FIG. 1. The process flow and the construction of the optical package of process 5 is diagrammatically shown in FIG. 3e.

For all processes, additional mechanical pressure might be applied, which is basically defined by the application scenario and the required process sequences used there, but it is not necessary.

There will be at least one optical connection per optical chip realized by the individual processes.

With materials suggested in this application as defined above, the preceding processes 1 and 3 make available a Δn of at least 0.0015 and up to around 0,012, as far as already tested. Use of processes 2 and 4 makes available a Δn of at least 0.002 and up to around 0.014, as far as already tested, with or without subsequent processing of the optical layer in a lamination press at 200° C. This is large enough for SM (single mode) and MM (multi mode) waveguides to adequately guide light.

The precision of the optical alignment attained in this process is well below 1 μm, in many cases below 0.5 μm, which is sufficient for creating multi-mode and single-mode optical interconnections. The diameter of the waveguides can be designed as needed to suit the application. Since this diameter is often around 9 μm, the precision is better than 5%, relative to the diameter of the optical interconnection.

In order to provide an optical package having optical interconnections which guide the light with a good BER (bit error ratio), it is preferable that the waveguide's optical loss is in the range of at least about 0.05 to 0.2 dB/cm at 850 nm, at least about 0.1 to 0.3 dB/cm at 1310 nm and at least about 0.25 to 1.5 dB/cm at 1550 nm.

In addition to creating waveguide structures, the waveguides can be registered in situ to any optical device, such as laser diodes or optical chips as well as corresponding receiving devices with known geometry, as described above. The alignment process is decoupled from the assembly process, which fits well with the existing manufacturing industry landscape. The main prerequisite for the precision registration process is to know the exact geometrical data of each position of the optical I/Os in the arrangement and their optical coupling properties, e.g. numerical aperture, mode field diameter, or geometry. As this data is readily available from design data of the components, the end points of the waveguide structures and their geometries can be well described. The registration then is carried out by identifying the component, measuring this geometry, using the resulting data for calculating the location of the I/O using the design data. This defines the starting point and the tensor of the waveguide structure. The same procedure is applied to the other end of the waveguide structure. With all geometrical data known the waveguide structure can be calculated in situ. This allows the process to compensate for any misalignment occurring in the placement process, and precisely aligning the waveguides with the optical I/Os on either side.

In addition to simply writing a 3D waveguide structure with the TPA or multi-photon absorption process, the interfaces between the waveguides and the optical I/O may be tailored to maximize the coupling efficiency. While simple I/O structures might merely consider the NA of the arrangement, and allow the waveguide structure to be starting with a standoff of a 10 s of micrometers, adjusting the waveguide to the mode field diameter by using a taper is significantly more challenging, but can be realized with the present invention. Thus, optimization of the optical interconnection using the 3D waveguide structuring is possible.

The versatility of the process offers various opportunities for simplifying the creation of optical modules and devices. At the same time the process depends on the usage of designed materials that have very specific properties. The main reason is that the material used for creation of the 3D structures is applied once and then fulfils multiple purposes: (a) It is polymerized in the two-photon or multi-photon polymerization process to yield the desired 3D structures; (b) the non-polymerized matrix material is subsequently cured using a different mechanism so that the optical density, hence the resulting refractive index profile, is different from the TPA or multi-photon polymerized material; (c) the Δn can be retained throughout the operational lifetime of the optical device; (d) a low waveguide absorption as preferred (<0.4 dB/cm, dependent on the chemical composition and structure of the material as well as on the application wavelength) can be provided; (e) the material withstands the process conditions of the optoelectronic substrate and component manufacturing; (f) other desirable properties like low water uptake, CTE (coefficient of thermal expansion) matching the optical chip material and the surrounding socket as well as flexibility can be attained, as far as required.

While most planar waveguide optics are capable of providing functional interconnects in 2 dimensions, 3-dimensional waveguides and interconnections are much more complex to create using standard technology. The transfer of light from one layer in an optical waveguide arrangement to another layer in the same arrangement can be done in multiple ways: integrated mirrors, gratings, lenses. Most arrangements require a combination of multiple precision processes for the in- and out-coupling of light into the layers. By using the two- or multi-photon absorption structuring process, the creation of true 3-dimensional waveguide structures is possible. The process can be adjusted to create single-mode and multi-mode waveguide structures, 3D taper structures, photonic crystal structures and other optical features or devices like arrayed waveguide gratings (AWG). Further, 3D-AWG may be produced, which might be useful in telecom or datacom applications. The in situ combination of different optical elements is possible, which can be a path for creation of 3D-optical circuitry that can actually be manufactured in a convenient way.

Figure 2:
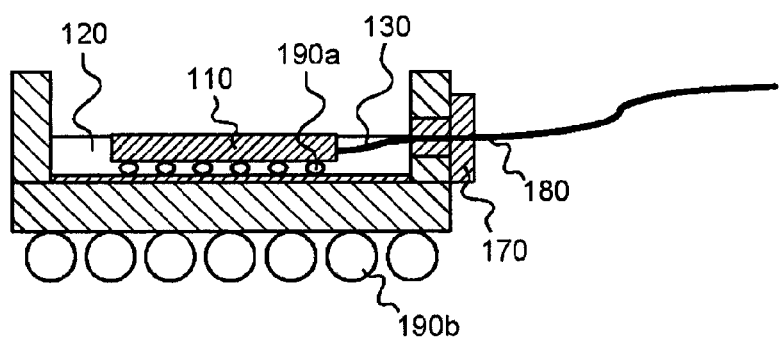
FIG. 2 is a schematic drawing of an optical package of the invention,
FIGS. 3a-3e indicate the construction of the optical package by five different process sequences.
Figure 6:
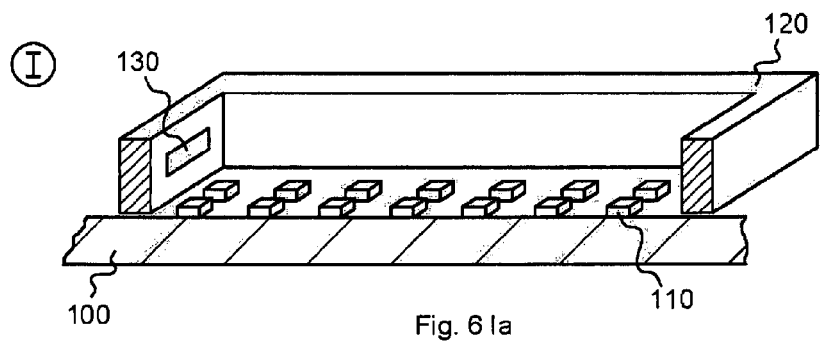
FIG. 6 is a schematic illustration of the preparation of an optical package including an optical chip within a surrounding wall, the wall having a window for an optical interconnection,
FIG. 7 indicates a number of possible cross-sections within the optical interconnection.
Figure 6:
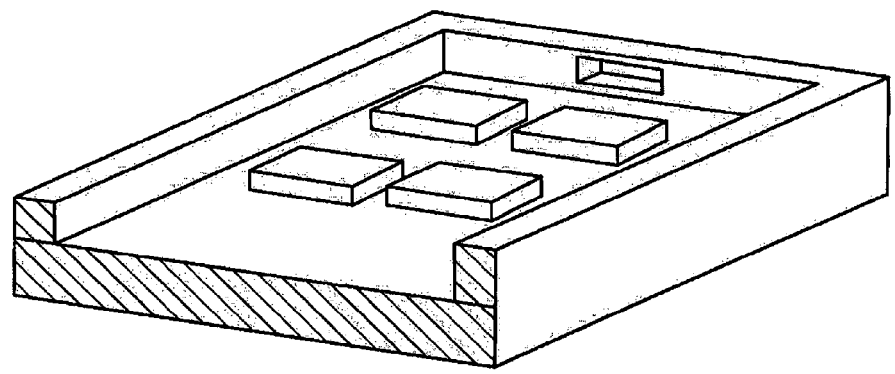
Figure 6:
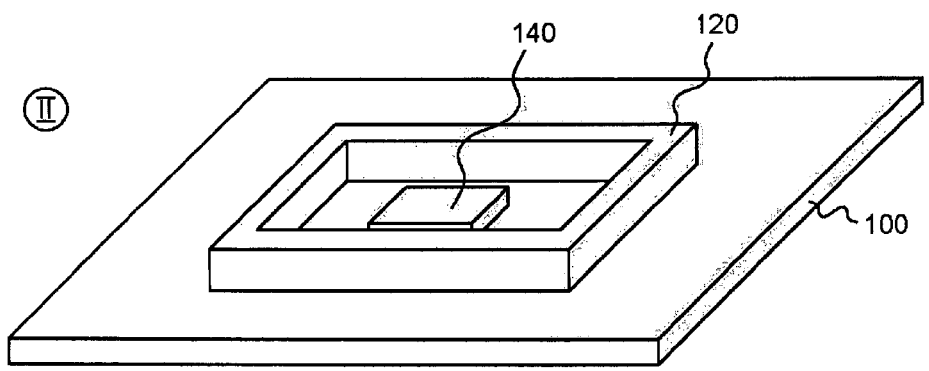
Figure 7:
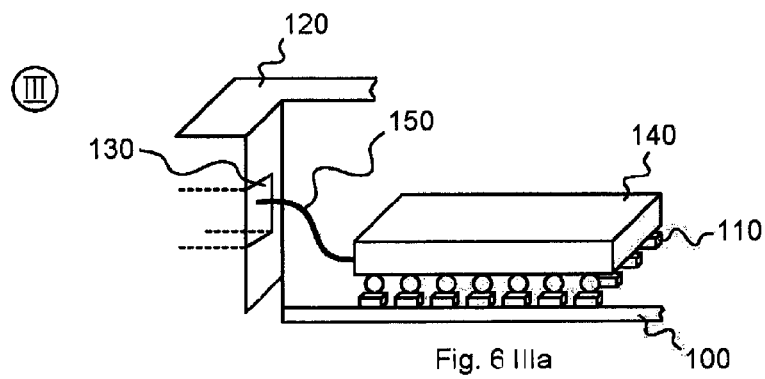
Figure 7:
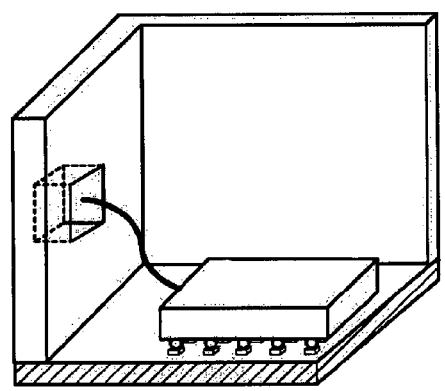
Figure 7:
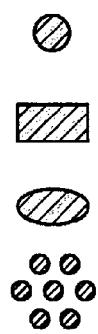
Figure 8:
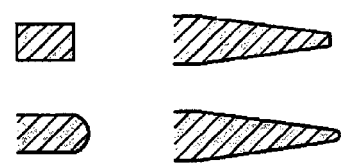
FIG. 8 shows diagrammatically different longitudinal shapes of an optical interconnection.

FIG. 2 is a scheme of an optical package. It is to be noted that the module is shown as BGA (ball grid array), yet it will be obvious to the expert that any type of electrical connection could be used, like wire bonding, LGA, DIP, direct galvanic connections (e.g. for embedded components) and the like, both for the components attached in the module as well as the attachment of the module itself. FIG. 6, part Ia depicts a substrate 100, made e.g. from FR4, PI comprising electrical contacts, made e.g. from copper. A frame 120 (only partly shown) is placed around the electrical contacts, comprising openings 130 for optical cables. In FIG. 6, part Ib, the same structures are shown. In part II, an optical chip 140 has been placed within the frame 120. Part III indicates the waveguide 150 after step (e) of the present invention has been performed; it has to be noted that the cladding/filling material around the waveguide is not shown. This material can fill the full space between the chip and the frame up to a height which can be selected arbitrarily, provided that it reaches the highest point of the waveguide. Possible cross-sections of the waveguides at the places of coupling in and coupling out are shown in FIG. 7. Possible cross-sections along the waveguide are seen in FIG. 8. It is to be noted that these figures are not necessarily shown in scale. Further, it has to be noted that the waveguides may have the same diameter along their path, or they may be tapered. They may have the same shape of cross-section (e.g. round, oval, square-edged, . . . ) over their full length, or the shape may change (e.g. from round to oval or to square-edged). Moreover, specific end shapes are possible which in general can be arbitrarily selected according to the requirements of the respective components.

The material for waveguide 130/150 and the surrounding cladding/filling ("material for component (iii) and the optical interconnection embedded therein") was synthesized, and the waveguide was prepared as follows:

EXAMPLE 1

(a) Synthesis of the Material

Into 302.3 gms (1.02 mol) of Trimethylolpropantriacrylate (TMPTA) in 1020 ml ethyl acetate and an ethanolic KOH solution, which is required as the catalyst for the thiol addition, 153.3 gms (0.85 mol) 3-mercaptopropylmethyldimethoxysilan were dropwise added under cooling. The mixture was then stirred at room temperature. The completion of the reaction (thiol addition) can be ascertained by the iodine-mercaptane test. After adding aqueous HCl for hydrolyzation, stirring is continued at room temperature. The progress of the hydrolysis is monitored by water titration. Work-up is made after stirring for one day by extraction with water and filtration over a filter made hydrophobic. The solvent is removed by using a rotary evaporator and subsequent vacuum oil evacuating pump. The resulting resin is liquid, having a viscosity of around 9 Pas at 25° C. It is then mixed with 2 wt % photoinitator, relative to the amount of the starting silane, under yellow light.

(b) Preparation of the Optical Interconnection

The necessary amount of the resulting resin is applied to a substrate comprising a structure having an optical input/output. During preparation of the device of the invention according to step (e) of the inventive process, the resin is subjected to process 4, resulting in waveguides 150 within a "cladding". The difference of the refractive index Δn between the waveguide material and the cladding was measured to be around 0.002.

EXAMPLE 2

(a) Synthesis of a Resin Having a Multiplicity of Identical C—Si-Bound Radicals Each with One Methacrylate and One Hydroxyl Group (See DE 44 16 857 C1)

125.0 g (0.503 mol) 3-glycidyloxypropyltrimethoxysilane are poured in a glass vessel and are stirred in a dry atmosphere. 1.31 g (0.005 mol) triphenylphosphine as catalyst, 0.2 wt.-% BHT as stabilizer are introduced. Subsequently, 47.35 g (0.550 mol) methacrylic acid are added dropwise to the mixture which is then stirred at 80° C. for approximately 24 h. The course of reaction (conversion efficiency) can be followed via the decrease in carboxcylic acid by titration of the acid as well as via the conversion of the epoxide groups by Raman spectroscopy or epoxide titration The epoxides' characteristic vibrational mode can be detected in the Raman spectra around 1256 cm$^{-1}$. The conversion of epoxide and of carboxylic acid, respectively, is 99% and 89%, respectively (due to the 10% excess of carboxylic acid). After the addition of acetic acid ester (1000 ml/mol silane) and H$_2$O for hydrolysis (using HCl as catalyst), the mixture is stirred at 30° C. Der course of hydrolysis is observed by water titration. Working-up is made after stirring for a number of days by multiple extraction by shaking with aqueous NaOH and with water and by filtration over a hydrophobized filter. Then, a rotary evaporation is performed, and subsequently, solvent is drawn off by oil vacuum. A liquid resin is yielded, despite the absence of reactive diluents (monomers), the resin having a very low viscosity of about 3-6 Pa·s at 25° C. (dependent on the specific hydrolysis and working-up conditions) and being free of free carboxylic groups (0.00 mmol CO$_2$H/g).

EXAMPLE 3

(a) Synthesis of a Resin Carrying Radicals Comprising Norbornenyl Groups (See DE 10 2011 054440 A1)

To 132.2 g (0.50 mol) of the resin of example 1, about 72.1 g (1.1 mol) cyclopentadiene (CP) (freshly obtained by cleavage of dicyclopentadiene) are distilled at about 90° C. under stirring. Stirring is continued further for about 1-2 h at 90° C. The course of reaction (conversion efficiency) can be observed by NMR as well as via the decrease of the ν(C═C, methacrylic) band (1639 cm$^{-1}$) and the formation and increase of the ν(C═C, norbornenyl) band (1574 cm$^{-1}$) by Raman spectroscopy. The volatile components like e.g. non-reacted cyclopentadiene are removed in the oil vacuum at temperatures of up to 90° C. A liquid resin is formed, having a viscosity of about 74-86 Pa·s at 25° C. (dependent on the specific synthesis and working-up conditions).

(b) Production of a Component Including an Optical Interconnection Embedded Therein TMPMP was added to a sample of the resin obtained according to (a) above in such an amount that the relation of thiol groups to norbornenyl groups was 1:1. 0.3% by weight of Lucirin TPO was added as initiator. Next, the resin was spin applied to a substrate (e.g. to a glass substrate via spin coating) comprising a structure having at least one optical input and/or output. The resin was irradiated with light having a wavelength of 515 nm for 5 min by which a solid material is obtained (crosslinking by thiol-en-addition). Subsequently, a two- or multi photon absorption is initiated with the aid of a femtosecond laser. This can be made e.g. with light having a wavelength of 515 nm at a repetition rate of 10 MHz in this example, however, it has to be mentioned that this is neither restricted in wavelength nor in repetition rate. By moving the laser within the volume of the resin, optical interconnections having a round or square intersection could be obtained. Structuring was performed using different mean laser powers, starting at about 4 mW and decreasing in incremental steps of 0.25 mW down to a mean laser power of 0.25 mW. 17 structures having a size of 25 μm edge length and 20 layers, which corresponds to a structural height of about 10 μm with the selected slice distances. The writing speed was 100 μm/s. This process is performed in accordance with "process 5" above.

Structuring was performed using an immersion objective having a numerical aperture of N.A.=1.4.

EXAMPLE 4

Example 3 was repeated, except that the relation of thiol groups to norbornenyl groups was 0.5:1. 0.3% by weight of Lucirin TPO was added as initiator. The mixture was subjected to visible light of 200 to 500 nm for 1 to 3600 seconds (the time is not critical, there is no upper limitation).

EXAMPLE 5

Example 3 was repeated, except that the relation of thiol groups to norbornenyl groups was 0.9:1. 0.3% by weight of Lucirin TPO was added as initiator. The mixture was subjected to visible light of 200 to 500 nm for 1 to 3600 seconds (the time is not critical, there is no upper limitation).

Figure 9:
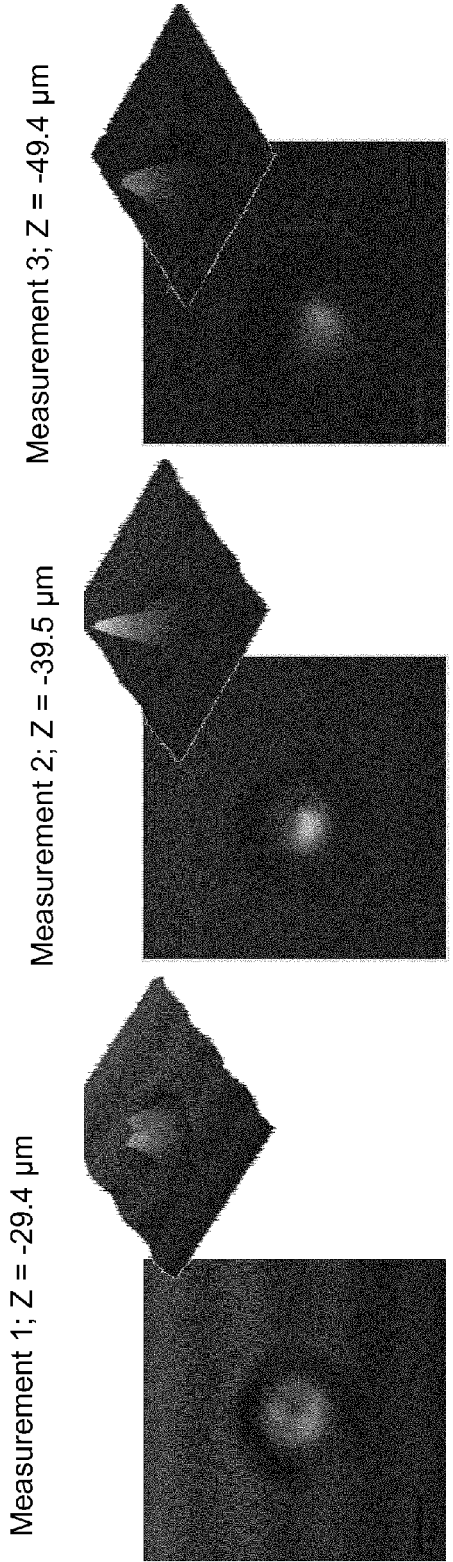
FIG. 9 shows photographs made by a reflected-light microscope, proving the guidance of light within a UV cured and then TPA structured material.

Surprisingly, despite the fact that UV irradiation of the resin resulted in a solid material, it was possible to prepare an optical interconnection within the component material having a different refractive index, compared to the material which was only irradiated by UV light. This can be proven by photographs with a reflected-light microscope, see FIG. 9, which show the guidance of light within the "written" structures (optical interconnections): Only if a difference of the refractive index between the material of the written structures and the embedding component exist, light guiding and therefore and optical interconnection is obtained.

LIST OF REFERENCE NUMBERS IN THE FIGS. 2 TO 4

100 substrate
110 optical component
120 optical material, uncured or cured, dependent on the step sequence
130 3D optical waveguide
150 module frame
160 module circuit board
170 standard connector
180 optical fiber
190a solder balls for attaching 110
190b module solder balls for attaching the complete BGA

LIST OF REFERENCE NUMBERS IN FIG. 6

100 substrate
110 electrical contacts
120 frame
130 opening (hole) within the frame
140 optical component, e.g. optical chip
150 3D optical waveguide

What is claimed is:

1. A package including optical components, the package comprising:
    a substrate;
    an element selected from
        a frame placed around electrical contacts, or
        a socket surrounding an inner area of the package and providing electrical interconnections;
    at least two structures each comprising at least one optical input or optical output, wherein a first one of the at least two structures is a wall of the frame or of the socket and a second one of the at least two structures is mounted within the inner area of the package;
    at least one optical interconnection optically connecting the at least one optical input or optical output of the first of the at least two structures with the at least one optical input or optical output of the second of the at least two structures;
    a component in which the at least one optical interconnection and the at least one optical input or optical output of the first of the at least two structures or of the second of the at least two structures is embedded, wherein
        (a) the component is comprised of a first material and the at least one optical interconnection is comprised of a second material, wherein said first and second materials are chemically identical, wherein said first material has a first primary and/or secondary structure and said second material has a second primary and/or secondary structure, wherein the first primary and/or secondary structure is different from the second primary and/or secondary structure;
        (b) the component has a first refractive index and the at least one optical interconnection has a second refractive index, wherein the first and second refractive indices differ from each other by at least 0.0004 at 850 nm, 1310 nm, and 1550 nm, respectively; and
        (c) the at least one optical interconnection is mechanically fixed by the component;
    wherein a precision of an optical alignment of the at least one optical interconnection between the at least one optical input or optical output of the first of the at least two structures and the at least one optical input or optical output of the second of the at least two structures is below 1 µm.

2. The package according to claim 1, further comprising additional active or passive optical components created by TPA (two-photon absorption) writing.

3. The package according to claim 1, wherein the substrate is comprised of a material selected from the group consisting of silicon, silicon oxide, silicon nitride, glasses, ceramics, and lead zirconium titanate.

4. The package according to claim 1, further comprising a plastic moulding or sealing.

5. The package according to claim 1, wherein said first primary and/or secondary structure differs from said second primary and/or secondary structure in a degree of crosslinking and/or in a result of a re-arrangement.

6. The package according to claim 1, wherein said first primary and/or secondary structure differs from said second primary and/or secondary structure in an order of chemical components within a network of said first material and within a network of said second material or differs in other structures within a chemical system of said first material and of said second material.

7. The package according to claim 1, wherein the component has at least one property selected from the group consisting of a bending strength of at least 50 MPa measured by a 3-point bending test; a flexibility so as to provide a radius of curvature in the range of less than 1 mm to 2 m; and the property of being extensible.

8. The package according to claim 1, wherein the component is in direct contact with the substrate.

9. The package according to claim 1, wherein a wall of the socket surrounding the inner area of the package comprises a hole and the at least one optical interconnection extends through the hole.

10. The package according to claim 1, further comprising one or more additional structures having at least one optical input and/or optical output, said one or more additional structures comprised of a third material which is chemically identical with said first material, wherein said third material has a higher degree of crosslinking than said first material.

11. A process for the preparation of a package as claimed in claim 1, comprising:
   a) providing a substrate suitable for solidification of a liquid or pasty material thereon, wherein
      a1) the substrate is equipped with optical devices including one or more first structures having at least one optical input and/or optical output and further including at least one second structure that is mounted on the substrate and comprises at least one optical input and/or optical output; or
      a2) the substrate is equipped with at least two optical devices each comprising a structure having at least one optical input and/or output,
   b) providing-a frame or
      a socket surrounding an inner area of the package and providing additional electrical interconnections;
   c) filling some or an entire space between
      c1) the optical devices of a1) or
      c2) the optical devices of a2)
      and a wall of the socket or a wall of the substrate with a material adapted to be photochemically polymerized by TPA (two-photon absorption) or multi-photon absorption such that the at least one optical input and/or optical output of the optical devices of a1) or of the optical devices of a2) is covered);
   d) providing one or more optical interconnections in direct optical contact with one of the at least one optical input and/or optical output of the optical devices of a1) or of the optical devices of a2) and further providing other structures, having at least one optical input and/or optical output and being present in the package after completion, by structuring said material with TPA (two-photon absorption) or multi-photon absorption and curing said material such that the at least one or more optical interconnections and each of said other structures having at least one optical input and/or output are formed;
   e) packaging the resulting structure, keeping free optical inputs and/or outputs of the package to the environment.

12. The process according to claim 11, wherein curing comprises irradiation of said material in TPA-structured (two-photon absorption) and non-TPA-structured (two-photon absorption) areas.

13. The process according to claim 11, wherein curing comprises UV irradiation of said material in TPA-structured (two-photon absorption) and non-TPA-structured (two-photon absorption) areas.

14. The process according to claim 11, wherein curing is performed by heating said material in TPA-structured (two-photon absorption) and non-TPA-structured (two-photon absorption) areas.

15. The process according to claim 11, wherein curing is performed prior to TPA (two-photon absorption) structuring.

16. The process according to claim 11, wherein curing is performed after TPA (two-photon absorption) structuring.

17. The process according to claim 11, wherein curing is performed prior to and after TPA (two-photon absorption) structuring.

18. The process according to claim 17, wherein curing is performed by heating and by irradiation of said material in TPA-structured (two-photon absorption) and non-TPA-structured (two-photon absorption) areas.

19. The process according to claim 11, further comprising eliminating the substrate after step d).

* * * * *